United States Patent [19]
Chu

[11] Patent Number: 5,509,946
[45] Date of Patent: Apr. 23, 1996

[54] INDOOR AIR FILTER

[76] Inventor: Kung-Ming Chu, No. 18, Kai An 6th St., Tainan, Taiwan

[21] Appl. No.: 380,008
[22] Filed: Jan. 27, 1995
[51] Int. Cl.$^6$ .................................................. B01D 47/00
[52] U.S. Cl. ........................ 55/233; 55/257.1; 55/259; 55/274; 55/322; 55/325; 95/211; 95/214; 95/221; 96/140
[58] Field of Search .......................... 55/233, 242, 257.6, 55/259, 274, 279, 322, 325, 257.1; 96/139, 140; 95/210, 211, 214, 221, 268

[56] References Cited

U.S. PATENT DOCUMENTS

| | | | |
|---|---|---|---|
| 3,261,147 | 7/1966 | Allander | 55/259 |
| 3,299,620 | 1/1967 | Hollingworth | 55/259 |
| 3,672,126 | 6/1972 | Goettle | 55/259 |
| 3,695,005 | 10/1972 | Yuzawa | 55/259 |
| 3,844,748 | 10/1974 | Lanier | 55/259 |
| 3,856,487 | 12/1974 | Perez | 55/259 |
| 3,972,678 | 8/1976 | Nakshbendi | 55/325 |
| 5,108,469 | 4/1992 | Christ | 55/259 |
| 5,122,169 | 6/1992 | Schumacher et al. | 55/259 |
| 5,180,405 | 1/1993 | Kuan | 55/259 |
| 5,342,420 | 8/1994 | Bosses | 55/279 |

Primary Examiner—C. Scott Bushey
Attorney, Agent, or Firm—Morton J. Rosenberg; David I. Klein

[57] ABSTRACT

An indoor air filter is provided. The indoor air filter has a housing including a water tank, an air pump, an air inlet, an air outlet, an air pump positioned between the air inlet and outlet, and an air circulation section between the air inlet and the air pump. The air circulation section is defined a pair of partitions enclosing first and second turbulent boards which enclose a foam filter and an active carbon layer. The housing also has a filter screen positioned between the air circulation section in the air inlet and a conduit for spreading water from the water pump into the inlet air for subsequent filtering by the filter screen and the air circulation section.

2 Claims, 4 Drawing Sheets

INDOOR AIR FILTER

FIELD OF THE INVENTION

This invention relates to an air filter, and more particularly, to an air filter which provides fresh and clean air indoors.

BACKGROUND OF THE INVENTION

Modern technology has brought many benefits to the modern world, but it has also brought countless problems. Air pollution, for example, one of the worst effects of modern technology, has created a hole in the ozone layer of the atmosphere. In addition, automobile exhausts, factory emissions, and second hand tobacco smoke are tremendously harmful to our health.

SUMMARY OF THE INVENTION

It is the primary object of the present invention to provide an indoor air filter which utilizes water, turbulent boards, a foam filter and active carbon to eliminate unwanted substances from the air.

It is another object of the present invention to provide an indoor air filter which is simple to operate It is a further object of the present invention to provide an indoor air filter which is easy to clean.

It is still a further object of the present invention to provided an indoor air filter which is inexpensive to manufacture.

DETAILED DESCRIPTION OF THE PREFERRED EMBODIMENT

Figure 1:
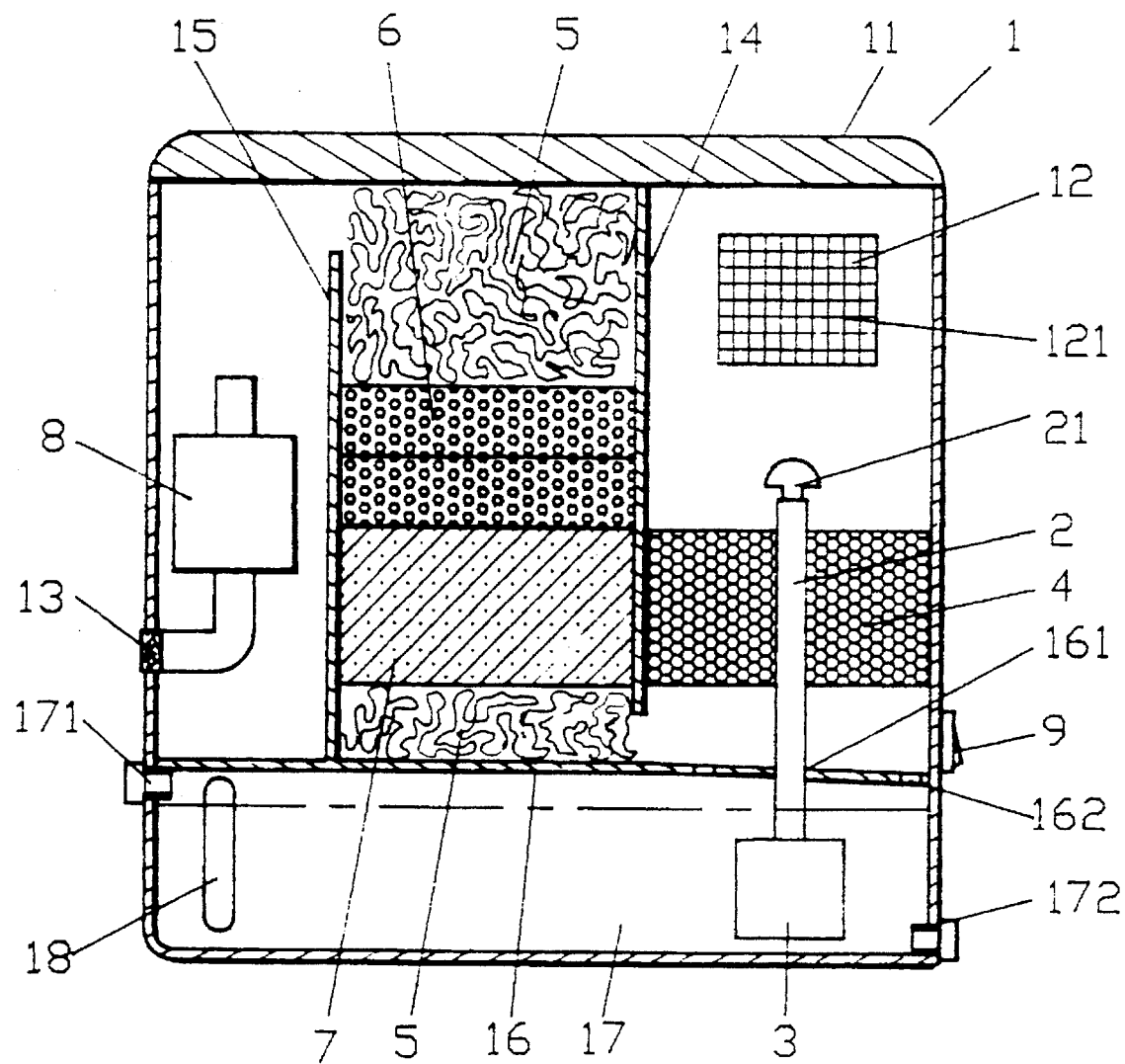
FIG. 1 is a cross-sectional view of the present invention.
Figure 2:
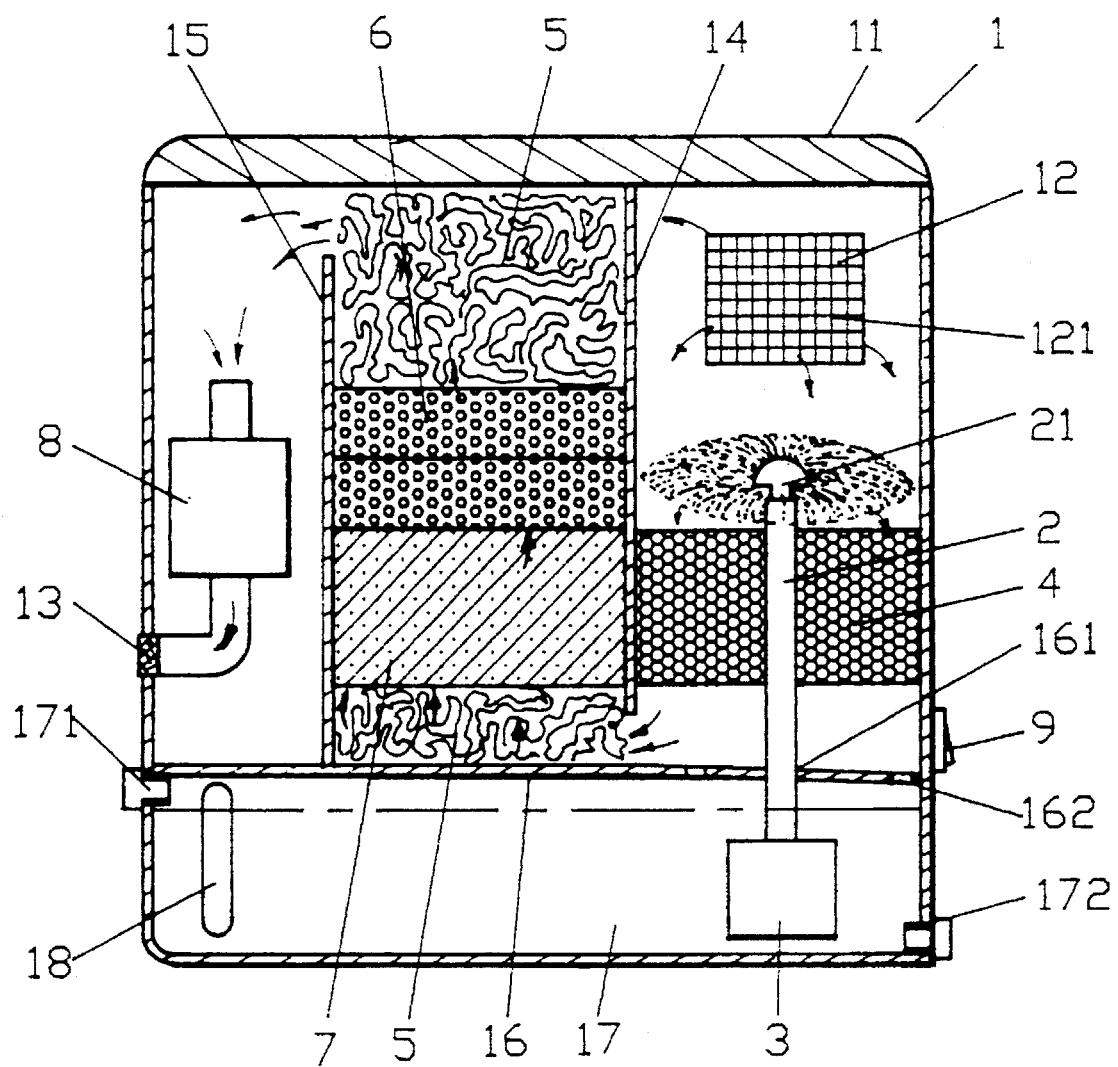
FIG. 2 is a cross-sectional view of the present invention in actual operation.
Figure 3:
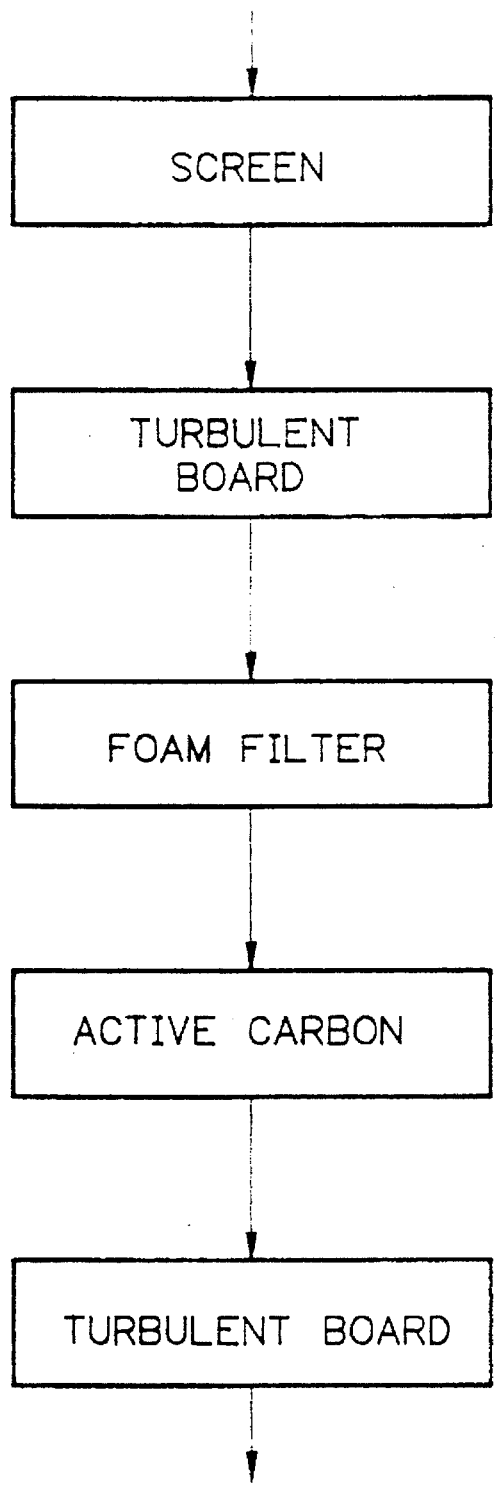
FIG. 3 is a flow chart showing the steps of purifying polluted air in accordance with the present invention; and, FIG. 4 is a cross-sectional view of a second embodiment of the present invention.

Referring to FIG. 1-4, there is shown a housing 1 having a water pump 3, an air pump 8, and an air circulation section. Housing 1 also has top cover 11, air inlet 12 and air outlet 13. Water pump 3 is positioned in water tank 17 which is located in a bottom portion of housing 1. A conduit 2 has a first end connected to water pump 3 and a second end extending upwardly from water pump 3 through partition opening 161. In a first embodiment, second end of conduit 2 has an enlarged portion 21 at its topmost portion. The air circulation section formed at a center portion in the housing 1 includes a first partition 14 and a second partition 15 at respective sides in housing 1, which isolate a pair of turbulent boards 5 which enclose foam filter 7 and active carbon 6, as shown, Partition 16 covers water tank 17, a viewing window 18 is formed on water tank 17 to monitor the water level in water tank 17.

In operation, air pump 8 draws air in through a screen 121 disposed in air inlet 12. When switch 9 is turned on, pump 3 forces water from tank 17 up conduit 2. Conduit 2 then spreads water from enlarged portion 21. This spread water mixes with inlet air to wash out organic particles and is drawn through screen 4, located under enlarged portion 21 of conduit 2, which is adapted to block particles carried by air. Water spread out from conduit 2 drains back into water tank 17 through opening 162 formed through partition 16.

The air, after passing through screen 4, then passes through an aperture under first partition 14, through first turbulent board 5, foam filter 7, active carbon 6 and second turbulent board 5. The air then flows through an aperture at the top portion of partition 15 and is then expelled by air pump 8 through air outlet 13. The air pumped out through air outlet 13 is clean and fresh.

Figure 4:
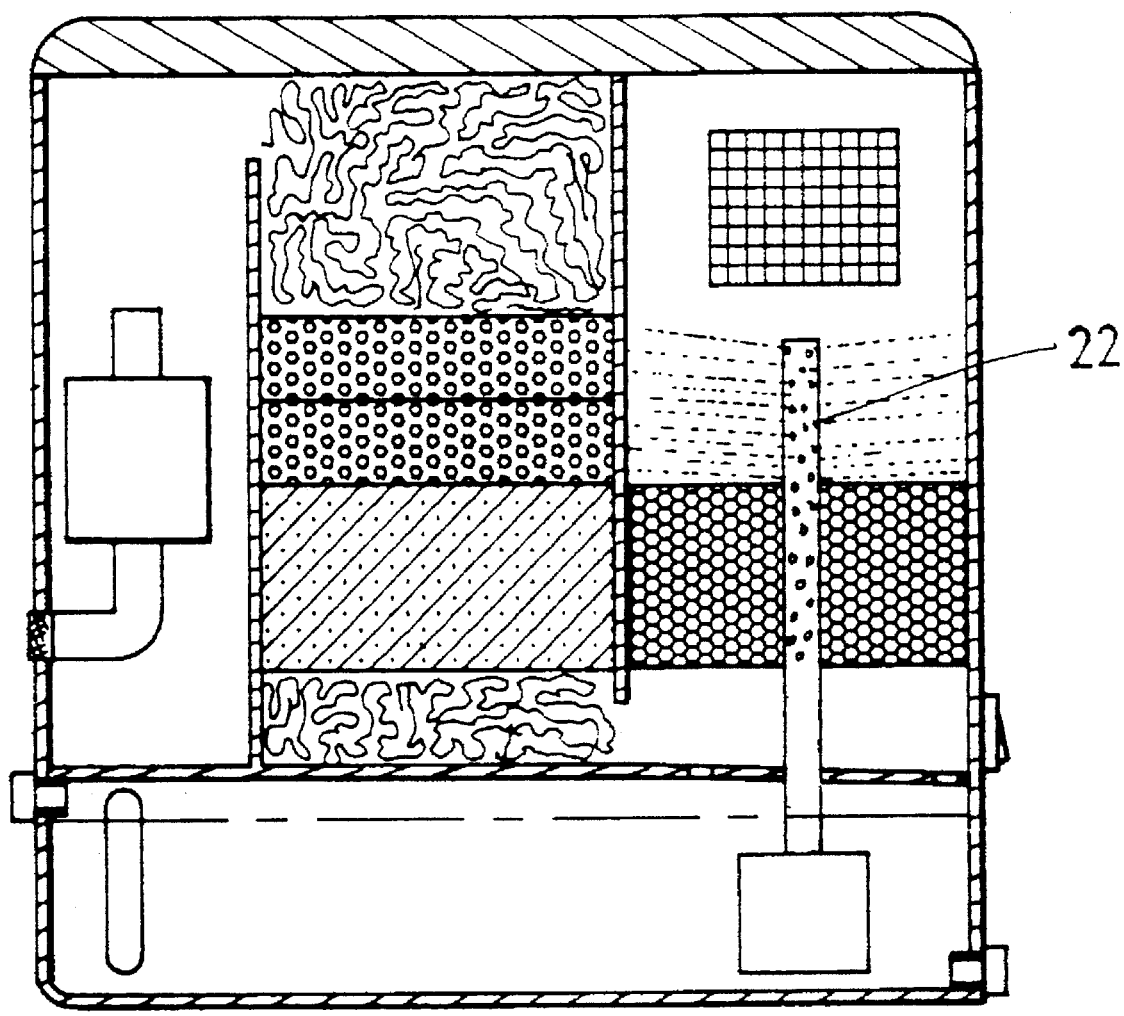

In a second embodiment, shown in FIG. 4, enlarged portion 21 of conduit 2 has been replaced with a plurality of holes 22 which are adapted to enable water to spread out therefrom.

In order to increase the effect of the present invention, an air fragrance may be mounted to air outlet 13 to produce a desired scent.

Water tank 17 includes fill plug 171 and drain plug 172 engaged in respective apertures of water tank 17.

I claim:

1. An indoor air filter, comprising:

a housing having a cover, an air inlet, and an air outlet;

a filter screen disposed between said inlet and said outlet;

a water tank disposed in a bottom portion of said housing, said tank having a cover;

a water pump disposed within said water tank;

a conduit having a first end operatively coupled to said water pump, said conduit extending upwardly from said water pump, through an aperture in said water tank cover and through said filter screen, said conduit having a second end distal from said first end located between said inlet and said filter screen;

means for spraying water coupled to said conduit second end, said water tank cover having an opening for permitting the sprayed water to return to said water tank;

a first partition located between said filter screen and said outlet, said first partition extending downwardly from said housing cover and leaving an aperture between said first partition and said water tank cover;

a second partition located between said first partition and said outlet, said second partition extending upwardly from said water tank cover and leaving an aperture between said second partition and said housing cover, said first and second partitions defining an air circulation section therebetween;

a first turbulent board disposed within a lower portion of said air circulation section;

a second turbulent board disposed within an upper portion of said air circulation section;

a foam filter disposed between said first and second turbulent boards;

an active charcoal filter disposed between said foam filter and said second turbulent board, said first and second turbulent boards, said foam filter and said active charcoal filter being disposed within said circulation section such that air passing through said circulation section must pass through said turbulent boards, said foam filter and said charcoal filter; and, an air pump positioned between said second turbulent board and said air outlet for drawing air into said air inlet, through said air circulation section and for forcing the air out said air outlet.

2. An indoor air filter according to claim 1, further comprising:

a viewer formed of a transparently sealed aperture in said water tank.

\* \* \* \* \*